(12) United States Patent
Kobayashi

(10) Patent No.: US 7,338,320 B2
(45) Date of Patent: Mar. 4, 2008

(54) SEALING MEMBER FOR WATERTIGHT CONNECTOR AND A MOLDING METHOD THEREFOR

(75) Inventor: Yutaka Kobayashi, Yokkaichi (JP)

(73) Assignee: Sumitomo Wiring Systems, Ltd (JP)

( * ) Notice: Subject to any disclaimer, the term of this patent is extended or adjusted under 35 U.S.C. 154(b) by 251 days.

(21) Appl. No.: 11/096,100

(22) Filed: Mar. 31, 2005

(65) Prior Publication Data

US 2005/0179209 A1    Aug. 18, 2005

(30) Foreign Application Priority Data

Apr. 2, 2004    (JP)    ............... 2004-109831

(51) Int. Cl.
*H01R 13/40*    (2006.01)
(52) U.S. Cl. .................. 439/587; 439/275
(58) Field of Classification Search ........... 439/587, 439/275, 274, 271
See application file for complete search history.

(56) References Cited

U.S. PATENT DOCUMENTS

| | | | |
|---|---|---|---|
| 5,328,382 A | | 7/1994 | Pawlicki |
| 5,667,406 A | * | 9/1997 | Tabata et al. ............ 439/587 |
| 5,704,796 A | | 1/1998 | Swenson |
| 6,196,873 B1 | * | 3/2001 | Murakami et al. ........ 439/595 |
| 6,808,418 B2 | * | 10/2004 | Horner ................... 439/587 |
| 2001/0007802 A1 | | 7/2001 | Horner |
| 2003/0207615 A1 | * | 11/2003 | Oota et al. .............. 439/589 |

FOREIGN PATENT DOCUMENTS

JP    3180026    8/1991

* cited by examiner

*Primary Examiner*—Gary Paumen
(74) *Attorney, Agent, or Firm*—Gerald E. Hespos; Anthony J. Casella

(57) ABSTRACT

A dummy plug (20) is formed with only one lip (25) having a wide outer surface (26) with a fine undulated pattern (30) that has repeated projections (31) of short height. The projections (31) are disposed to be tangent to a plane. Inclined surfaces (27) are formed at opposite ends of the outer surface (26). The inclined surface (27) guides the dummy plug (20) centrally into a cavity (11) while the outer surface (26) is compressed uniformly and resiliently over the entire circumference. The outer surface (26) closely contacts the inner surface of the cavity (11) due to a resilient force, thereby sealing the cavity (11). The fine undulated pattern (30) decreases the contact area and hence decreases the frictional resistance. Thus, the dummy plug (20) can be inserted smoothly inserted into the cavity (11) with a smaller force.

19 Claims, 13 Drawing Sheets

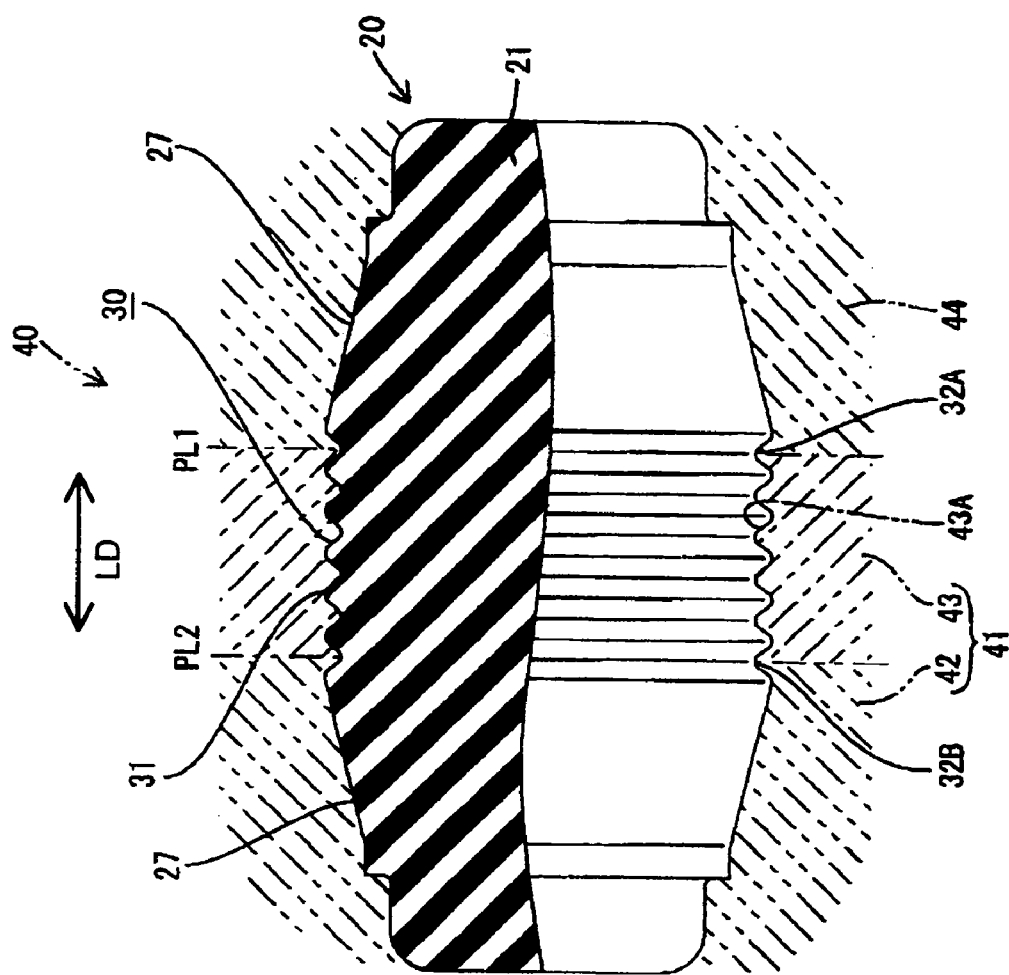
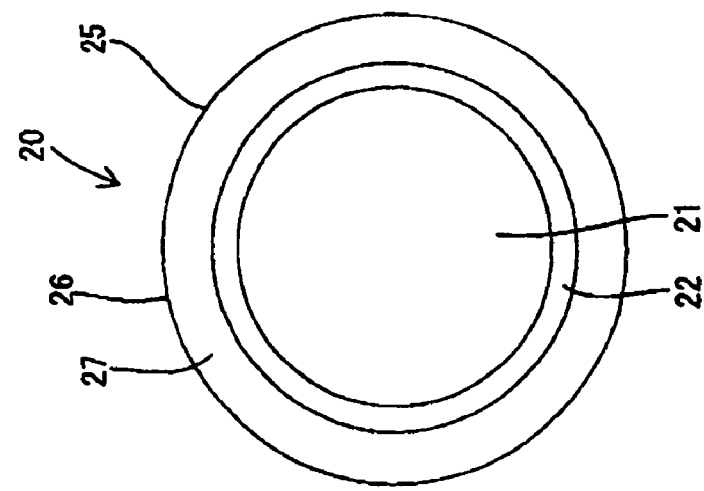
FIG. 2(B)
FIG. 2(A)

SEALING MEMBER FOR WATERTIGHT CONNECTOR AND A MOLDING METHOD THEREFOR

BACKGROUND OF THE INVENTION

1. Field of the Invention

The invention relates to a seal for use in a watertight connector and a molding method therefor.

2. Description of the Related Art

A watertight connector has a housing with a plurality of cavities. Terminal fittings and rubber plugs are secured to ends of wires and are accommodated in the respective cavities. Each rubber plug is dimensioned to seal the cavity when the terminal fitting is accommodated in the cavity formed in a housing. Some cavities may not require a terminal fitting. In these situations, dummy rubber plugs are prepared separately and are fit into the unused cavities. The outer circumferential surface of the typical dummy plug has three annular lips defining a wavy cross section in view an inserting force into the cavity, a holding force in the cavity and mold removal at the time of molding.

A sealed space between male and female connectors with dummy plugs may be compressed during connection the two connectors. Additionally, internal pressure may increase as air in the sealed space thermally expands during the use. Thus, there is a possibility that the dummy plugs will come out of the cavities against the holding forces. Accordingly, Japanese Patent Publication No. 3180026 discloses embedding auxiliary springs in the dummy plugs for assisting deformation of the dummy plugs to increase their diameters and to enhance the holding forces.

The biasing forces of the prior art auxiliary springs increase the diameters of the dummy plugs to enhance the holding forces. However, the projecting ends of the widened lips successively contact the opening edge at the entrance of the cavity while inserting the dummy plug into the cavity. This impedes a smooth insertion and can tear the lips. Therefore, there has been an earnest demand for further improvement.

Accordingly, an object of the invention is to provide an improved seal.

SUMMARY OF THE INVENTION

The invention relates to a seal made of a resilient material and used to hermetically seal a recess in a housing of a watertight connector by inserting the seal into the recess. The seal has a main body with a single lip that has a wide outer surface configured for close surface contact with the inner surface of the recess.

A sealing force is proportional to a resiliently compressed volume of an outer part of the lip. However, the seal of the subject invention has only one wide lip. Thus, a resiliently compressed volume is large as compared to conventional seals with a plurality of lips because the subject seal has no recess between the lips. Accordingly, a larger sealing force can be obtained.

The single lip on the outer surface of the seal preferably is configured so that a plane tangent to the outer surface of the seal will be substantially parallel to the longitudinal axis of the seal. Thus, the seal does not have a plurality of discrete lips with projecting ends that can successively contact the opening edge of the recess as the seal is inserted into the recess. Accordingly, the seal can be inserted smoothly and the lip will not be damaged or torn, and insertion forces are low.

The outer surface of the lip preferably has at least one portion that is inclined with respect to an inserting direction into the recess. The incline preferably is less than about 30°, more preferably less than about 20°, most preferably about 15° to the longitudinal direction.

The inclined surface guides the seal into a centered position, and the wide outer surface of the single lip portion is compressed substantially uniformly over the entire periphery. The outer surface of the lip of the properly inserted seal is held uniformly in close contact with the entire inner surface of the recess to seal the recess effectively.

The seal may be a dummy plug used to hermetically seal a cavity in the housing and preferably a cavity that has no terminal fitting accommodated therein. The dummy plug is less easily withdrawn, has a larger holding force and a larger sealing force.

The seal may be a waterproof resilient plug secured to an end of a wire by a terminal fitting and used to seal an entrance of a cavity in a housing as the terminal fitting is inserted into the cavity. The waterproof plug has a large sealing force and a small inserting force.

The seal may be a packing to provide hermetic sealing between two housings that are connected by engaging a projecting part and a recessed part. The seal may be mounted on the outer peripheral surface of the projecting part and may be squeezed resiliently between the outer peripheral surface of the projecting part and the inner peripheral surface of the mating recessed part.

The outer surface of the lip may include an undulated surface with projections and recesses that alternately repeat along the longitudinal direction. A projecting distance of the undulations is smaller than the longitudinal extension of the lip. Thus, an area of contact between the outer surface of the lip and the inner surface of the recess is reduced and a frictional resistance decreases. Accordingly, the inserting force for the seal is low.

Burrs are likely to be produced at parting lines in a mold for the seal. Thus, the parting lines preferably are set at or near recesses of the outer surface of the seal. The undulated surface enables the parting lines to be set easily using the recesses, including intermediate portions between the projections and recesses.

The undulated surface forms an undercut upon removing the seal from a molding hole. However, the undulation has a low height and will not be damaged even if the seal is removed with the undercut formed.

The lip preferably is formed symmetrically and has front and rear ends that are inclined more moderately. Thus, a dummy plug in accordance with the invention can be inserted smoothly with a smaller insertion force and can be guided and centered by the inclination regardless of whether the front or rear of the dummy plug is inserted first into the cavity. Similarly, a packing in accordance with the invention can be inserted smoothly into the mating recess with a low inserting force and can be guided and centered by the inclination regardless of whether the front or rear of the packing is mounted first on the outer surface of the projecting part.

The lip preferably extends over more than about half, preferably over more than about ⅔ of the longitudinal extension of the seal.

Preferably, the seal is rotationally symmetric about an axis.

The invention also relates to a method of molding a seal made of a resilient material. The method comprises providing a mold to form a seal with a single lip that has a wide outer surface. A portion of the outer surface is configured so that a plane tangent thereto is parallel to the longitudinal axis of the mold. The method then includes filling molding material into the mold.

The outer surface of the seal may have an undulated surface with projections and recesses that alternately repeat substantially along longitudinal direction and that have heights smaller than the height of the lip. The mold preferably has two or more mold portions and the parting lines between adjacent mold portions are at or near the recesses.

Parting lines in a mold for the seal preferably are at or near recesses of the outer surface of the seal. Thus, burrs produced at the parting lines do not impair the sealing function or the insertability of the seal. The undulated surface enables the parting lines to be set easily using the recesses.

These and other objects and features of the invention will be more apparent upon reading the following detailed description and accompanying drawings. Even though embodiments are described separately, single features may be combined with other embodiments.

BRIEF DESCRIPTION OF THE DRAWINGS

FIGS. 2(A) and 2(B) are front view and side view partly in section of the dummy plug.

DETAILED DESCRIPTION OF THE PREFERRED EMBODIMENTS

Figure 1:
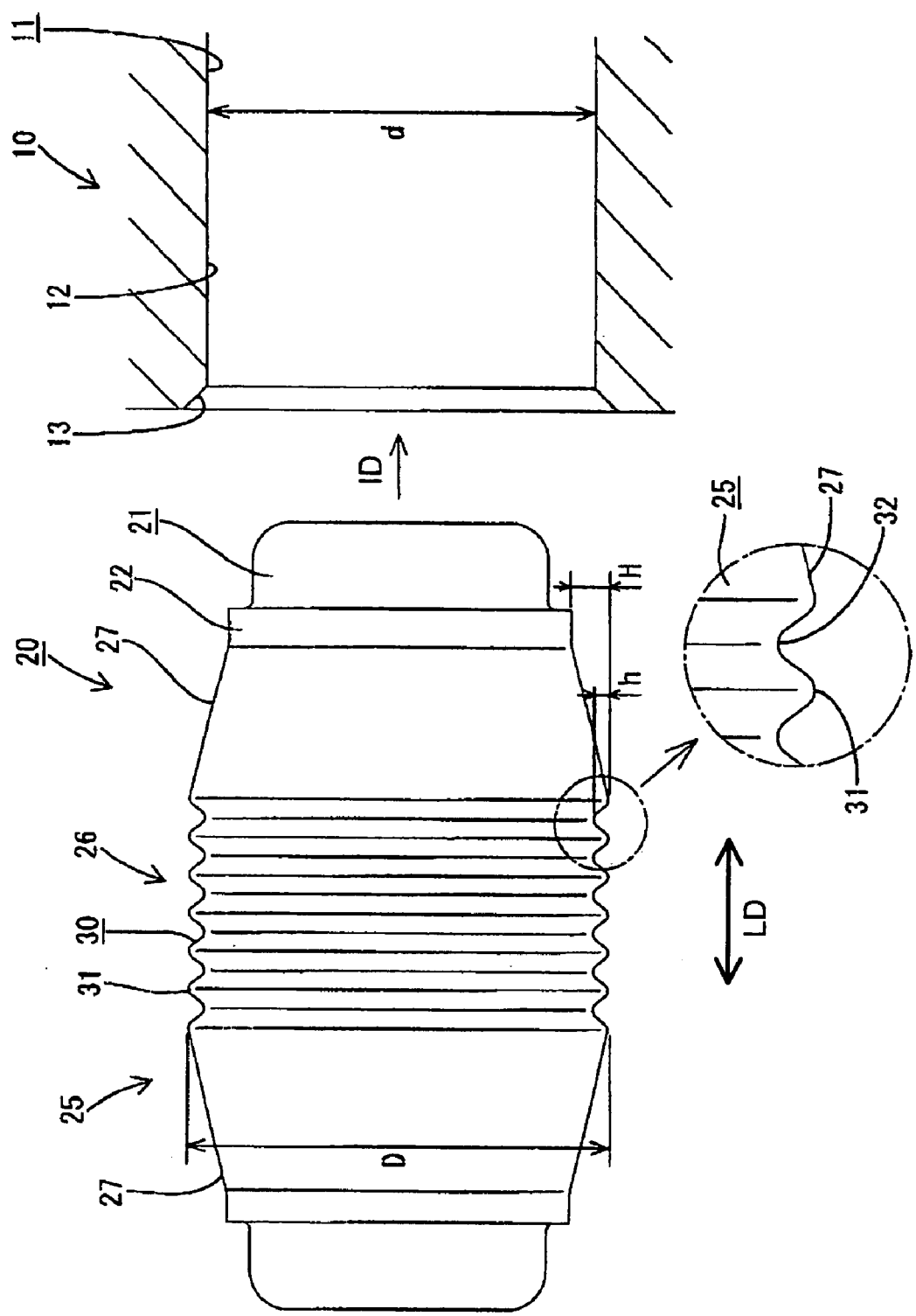
FIG. 1 is a side view partly in section showing a state before a dummy plug of a first embodiment of the invention is inserted into a cavity.
Figure 3:
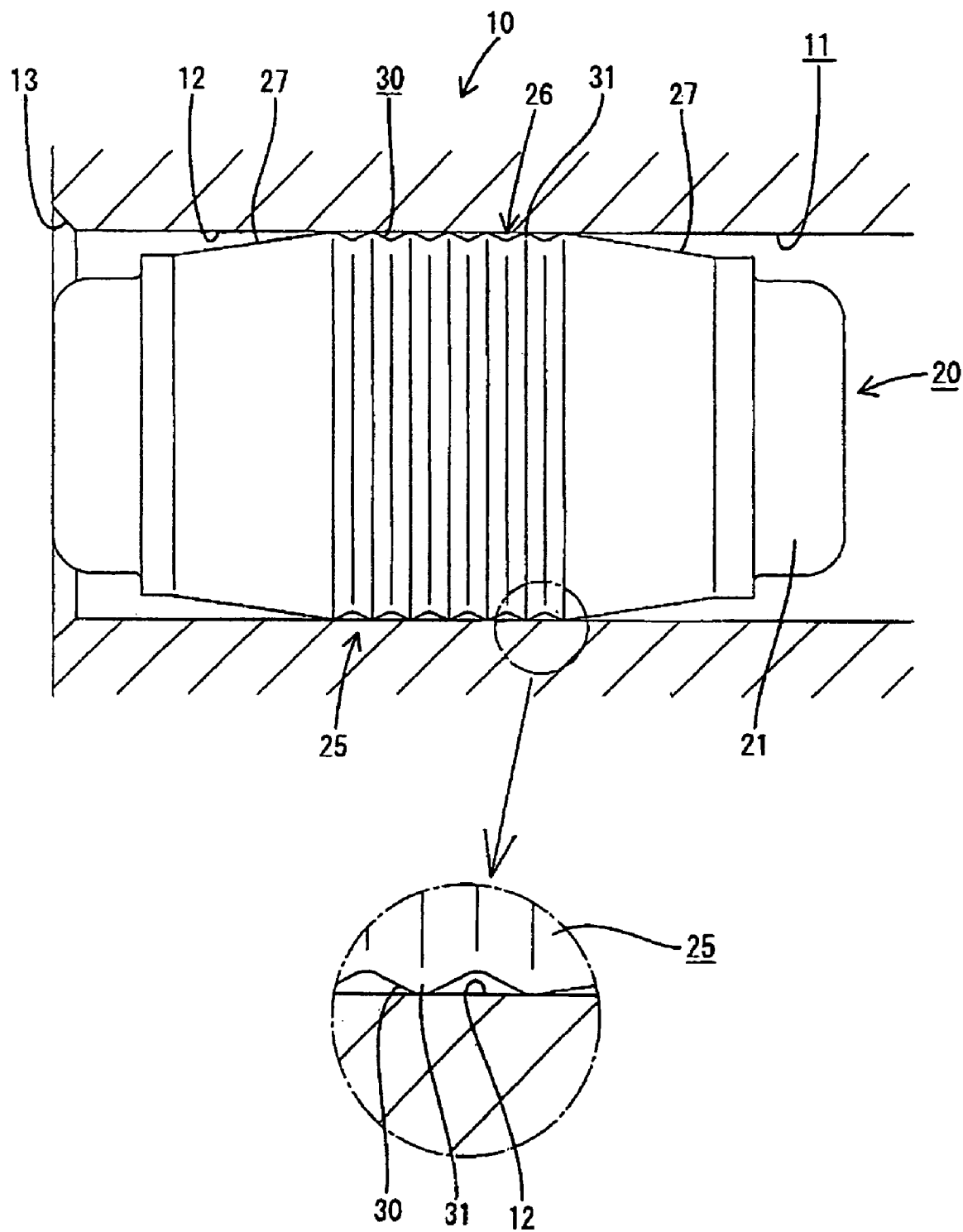
FIG. 3 is a side view showing the dummy plug in the cavity.

A dummy plug according to a first embodiment of the invention is identified by the numeral 20 in FIGS. 1 to 3. The dummy plug 20 is used with a housing 10 formed with cavities 11 for receiving terminal fittings (not shown). Each cavity 11 has a substantially round entrance 12 and a beveled guiding surface 13 is formed at the opening edge of the entrance 12. The dummy plugs 20 are inserted into the entrances 12 of the cavities 11 that will not receive the terminal fittings.

Each dummy plug 20 is made of a resilient material such as an oil-impregnated silicone and preferably is formed by injection molding in a mold 40. As shown in FIG. 2, the dummy plug 20 has a main body 21 and a large-diameter portion 22 that extends over a wide range at a longitudinal intermediate part of the main body 21. The large-diameter portion 22 is a stepped cylinder and defines a single wide lip 25 on the outer surface of the main body 21. The lip 25 is substantially symmetrical along a longitudinal direction LD of the dummy plug 20. The lip 25 has a longitudinal extension of more than about ¼, and preferably of more than about ⅓ of the longitudinal extension of the dummy plug 20. Moreover, the dummy plug 20 preferably is substantially rotationally symmetric about its longitudinal axis.

The lip 25 is formed over substantially the entire extension of the large-diameter portion 22 and includes an outer surface 26 and inclined surfaces 27 at opposite longitudinal ends of the outer surface 26. The outer surface 26 is in the longitudinal middle of the large diameter portion 22 and extends for slightly more than one third of the entire extension of the large diameter portion 22. Outer extremes of the outer surface 26 of the lip 25 define an outer diameter D that exceeds an inner diameter of the entrance 12 of the cavity 11. Additionally, a plane tangent to the outer extremes of the outer surface 26 will be substantially parallel with longitudinal direction LD. The inclined surfaces 27 have a moderate inward inclination of less than about 30°, more preferably less than about 20° and most preferably about 15° to the longitudinal direction LD.

Projections and recesses having a substantially triangular or pointed cross section are formed at substantially even intervals along the longitudinal direction LD on the outer surface 26 of the lip 25 to define an undulated surface 30. Each undulation of the undulated surface 30 has a height h that is as low as one third of the height H of the lip 25.

The mold 40 for the dummy plug 20 has a fixed mold 41 with a fixed portion 42 and a middle plate 43, and a movable mold 44 as schematically shown in FIG. 2(B). A first parting line PL1 between the movable mold 44 and the middle plate 43 of the fixed mold 41 is set at a recess 32A at one end of the undulated surface 30, whereas a second parting line PL2 between the fixed portion 42 and the middle plate 43 in the fixed mold 41 is set at a recess 32B at the opposite end of the undulated surface 30.

The dummy plug 20 is molded in the closed mold 40. The movable mold 44 then is separated forward from the fixed mold 41. Thus, the dummy plug 20 is left in a molding hole in the fixed mold 41. The middle plate 43 then is separated forward from the fixed portion 42 while the dummy plug 20 is held in a molding hole 43A of the middle plate 43. The middle plate 43 is rotated substantially normal to the longitudinal direction LD (i.e. normal to the plane of FIG. 2(B)) in front of the fixing portion 42. The dummy plug 20 then is ejected from the molding hole 43A of the middle plate 43 by a kick-out pin or the like.

The dummy plug 20 can be inserted into the entrance 12 of the cavity 11 as shown by an arrow of FIG. 1. Thus, the leading inclined surface 27 contacts the opening edge 13 of the entrance 12 to guide and center the dummy plug 20. The dummy plug 20 then is inserted into the cavity 11 while the outer surface 26 of the single lip 25 is compressed substantially uniformly and resiliently over substantially the entire circumference.

The outer surface 26 of the lip 25 of the properly inserted dummy plug 20 closely contacts and seals the inner surface of the entrance 12 of the cavity 11 over substantially the entire circumference, as shown in FIG. 3, due to the resilient force of the lip 25.

The sealing force and a force for preventing the dummy plug 20 from coming out of the cavity 11 when an inner pressure increases is proportional to a resiliently compressed volume of the outermost part of the lip 25. The dummy plug 20 has only one lip 25 with a wide outer surface 26 and a fine undulation. Thus, a resiliently compressed volume is larger than conventional dummy plugs with three lips. As a result, a larger sealing force and a larger holding force can be obtained.

On the other hand, the dummy plug 20 is centered and inserted with the outer surface 26 of the lip 25 substantially uniformly resiliently compressed over substantially the entire circumference. Further, the fine undulated surface 30 preferably is formed in the outer surface 26 of the lip 25 to reduce a contact area between the top surface 26 of the lip 25 and the inner circumferential surface of the cavity 11, thereby decreasing a frictional resistance. Thus, an inserting force for the dummy plug 20 can be reduced.

The fine undulated surface 30 in the outer surface 26 of the single lip 25 avoids having projecting ends of the lips successively contact the opening edge of the cavity 11 during insertion of the dummy plug 20 into the cavity 11. Accordingly, the dummy plug 20 can be inserted smoothly and the lip 25 will not be damaged or torn.

The parting lines in the mold 40 for the dummy plug 20 are in the recesses on the outer circumferential surface of the dummy plug 20. Thus, burrs produced at the parting lines will not affect sealing performance.

The formation of the undulated surface 30 in the outer surface 26 of the lip 25 results in an overhang or undercut while thrusting the dummy plug 20 out of the molding hole 43A of the middle plate 43. However, the height h of each undulation 31 is low (preferably less than about 1/20 of the radius of the dummy plug), and there is no possibility of being damaged.

The inclined surfaces 27 of the lip 25 are formed substantially symmetrically at the front and rear sides. Thus, the dummy plug 20 can be guided and centered by the inclined surfaces 27 and inserted smoothly with a smaller force regardless of which end of the dummy plug 20 is inserted first into the cavity 11. Thus, the inserting operation can be carried out irrespective of the orientation of the dummy plug 20.

Figure 4A:
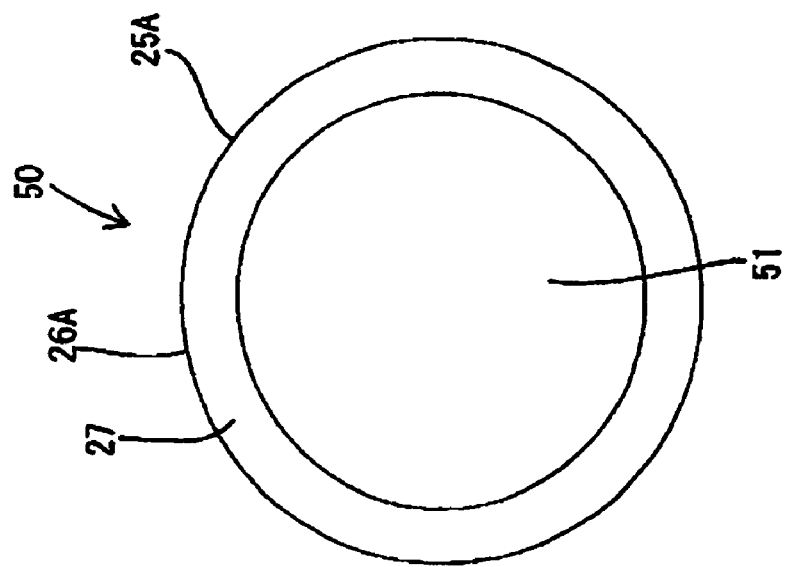
FIGS. 4(A) and 4(B) are a front view and a side view partly in section of a dummy plug according to a second embodiment of the invention.
Figure 4B:
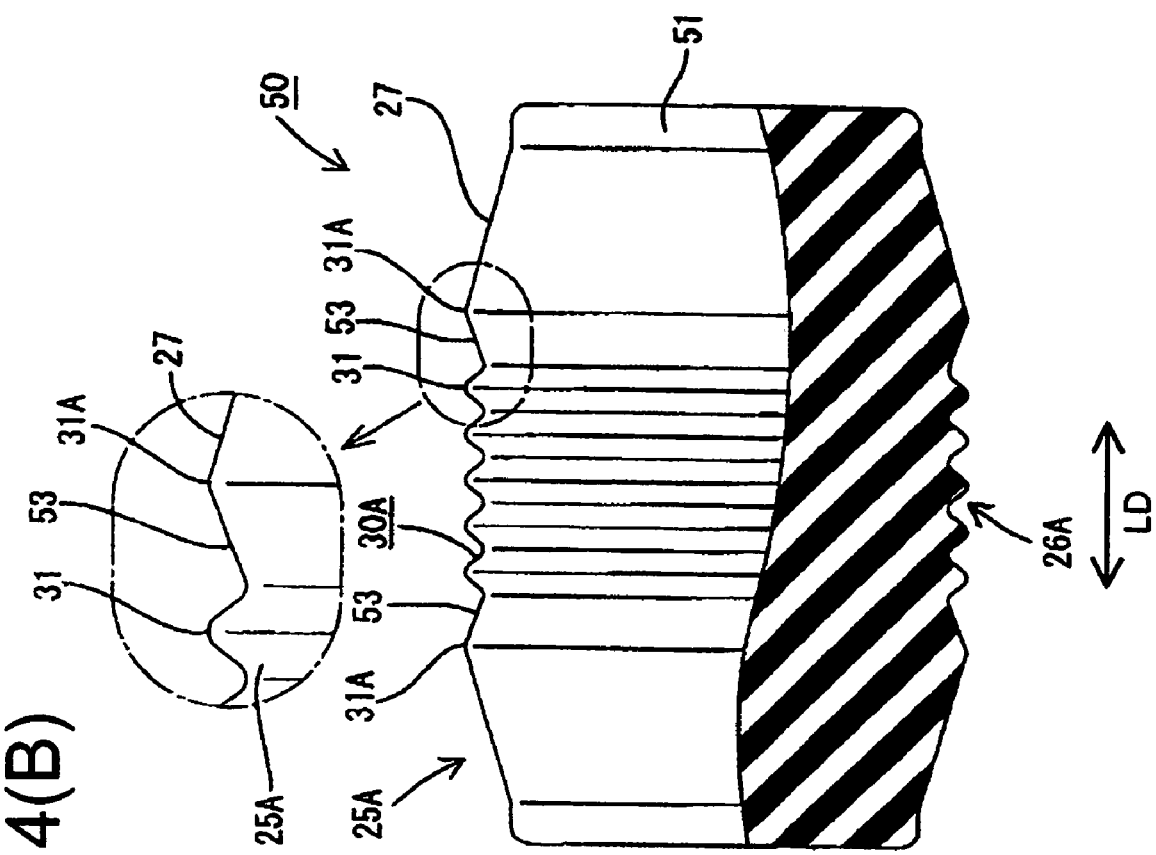
Figure 5:
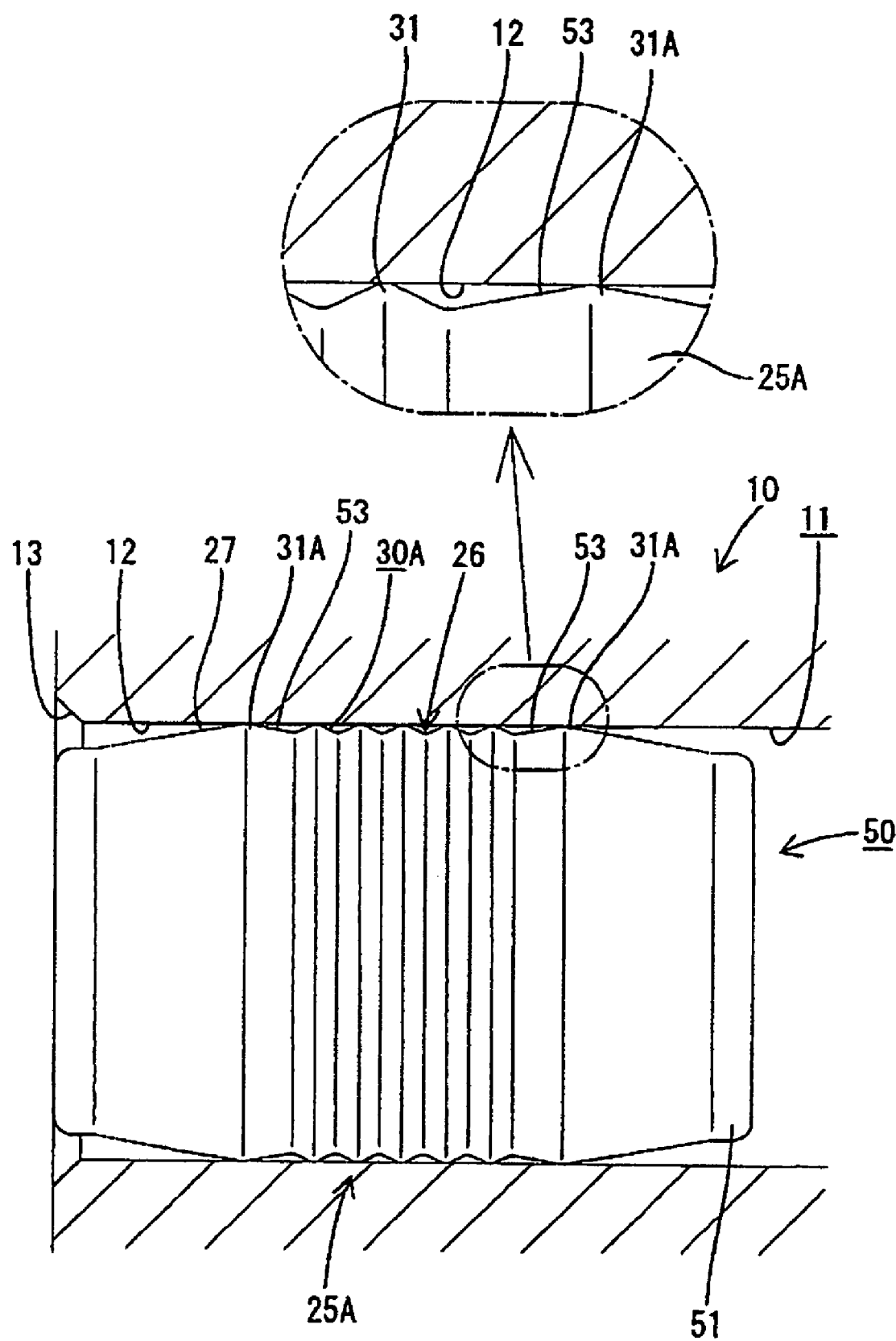
FIG. 5 is a side view partly in section showing a state where the dummy plug is inserted in a cavity.

A dummy plug 50 according to a second embodiment is illustrated in FIGS. 4 and 5. The dummy plug 50 has a short cylindrical main body 51 with a large diameter corresponding to the large-diameter portion 22 of the main body 21 of the first embodiment. The large-diameter portion 22 has a single lip 25A with an outer surface 26A that includes an undulated surface 30A. The undulated outer surface 30A includes projections 31 and 31A. Each projection 31A is at one of the opposite longitudinal ends and has a longer interval to the adjacent projection 31 than the intervals between other projections 31. Oblique surfaces 53 of the projections 31A at the opposite ends extend towards the inner recesses and have about the same moderate inward inclination of less than about 30°, preferably of less than about 20°, and most preferably about 15° to the longitudinal direction LD as the inclined surfaces 27 at the outer sides of the outer surface 26A. The wide lip 25A has a longitudinal extension of more than about 1/4, and preferably more than about 1/3 of the longitudinal extension of the dummy plug 50. Moreover, the dummy plug 50 is substantially rotationally symmetric about its longitudinal axis.

The other construction is similar to or the same as in the first embodiment. Elements having the same or similar functions are not described and merely are identified by the same reference numerals.

The projections 31A at the opposite ends are aligned at a moderate angle that preferably is less than about 30° with respect to the longitudinal direction LD and align with the undulations 30A in upper surface 26A of the lip 25A in the dummy plug 50. The aligned surfaces 27 and 30A contact the opening edge of the entrance 12 sequentially and the dummy plug 50 can be inserted smoothly into the cavity 11 with an eased contact force. The realization of a smaller inserting force was confirmed by experiments.

Figure 6:
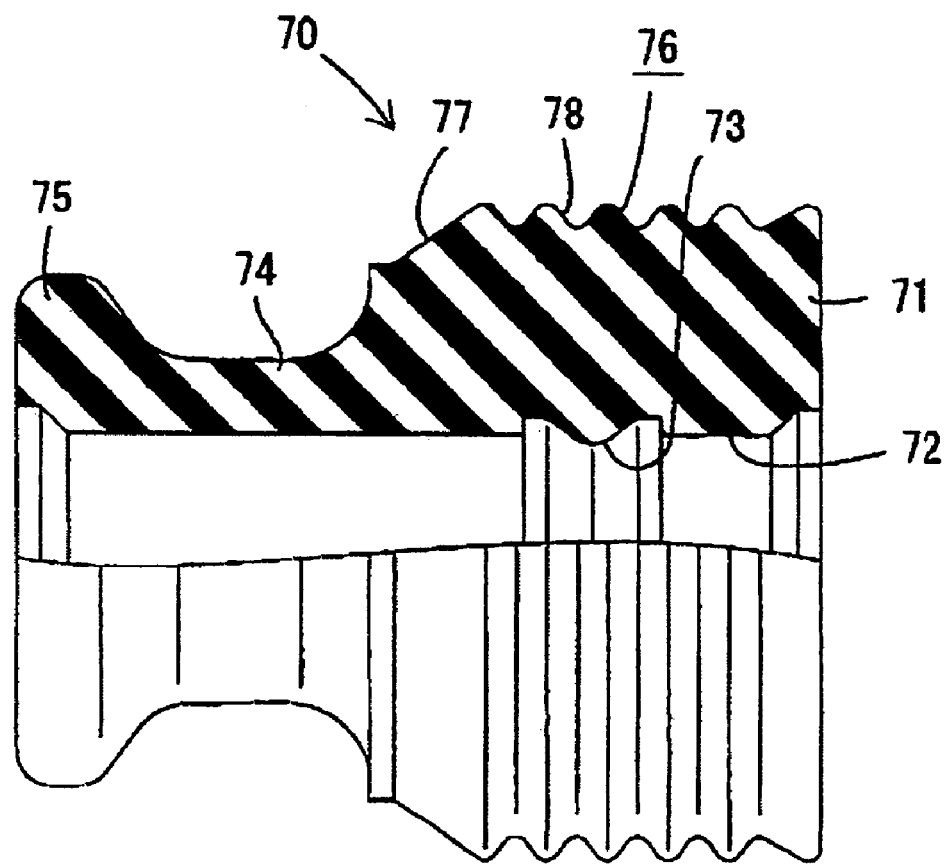
FIG. 6 is a side view partly in section of a waterproof rubber plug according to a third embodiment of the invention.
Figure 7:
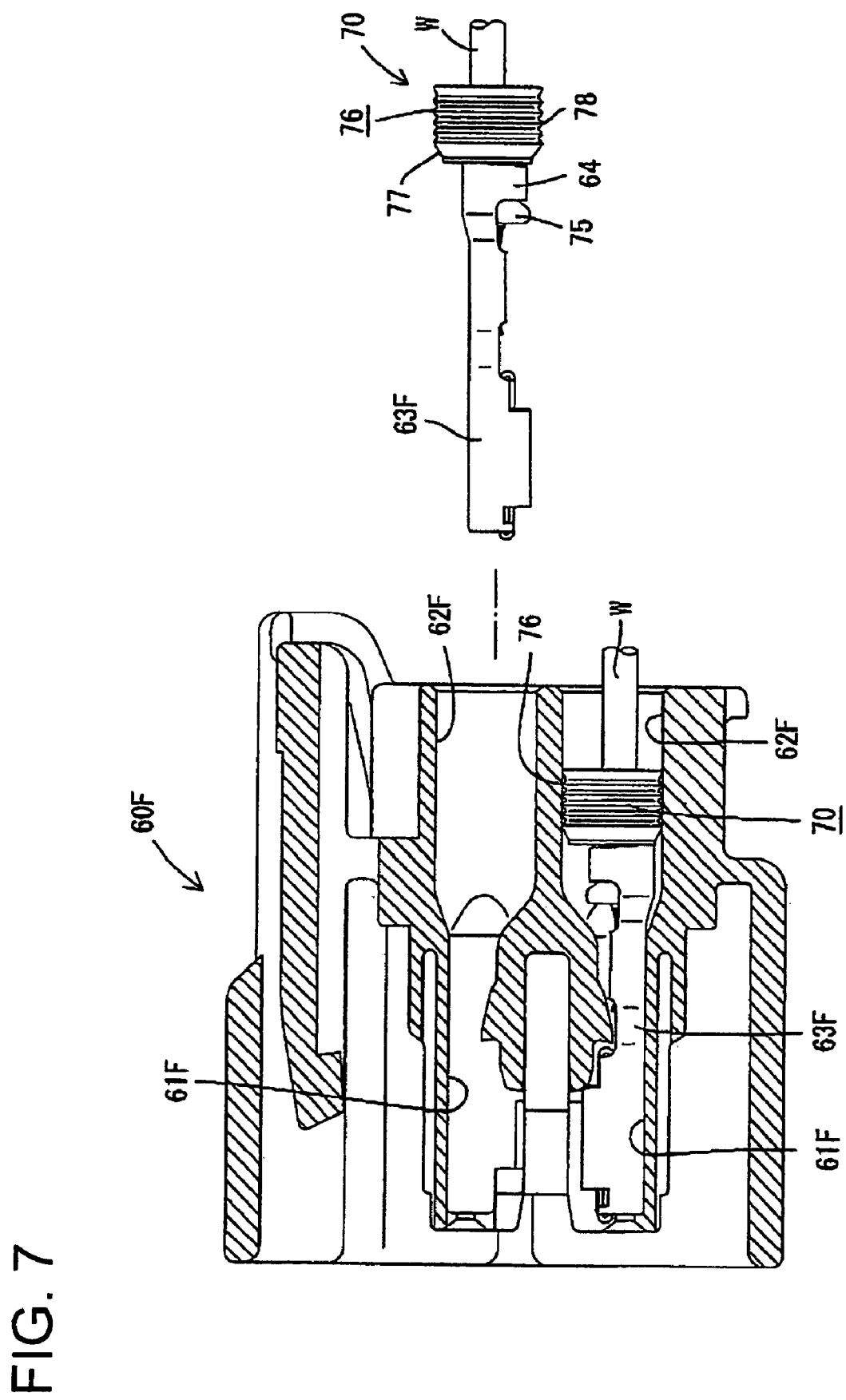
FIG. 7 is a side sectional view showing insertion a female terminal and the waterproof rubber plug into a cavity of a female housing.
Figure 8:
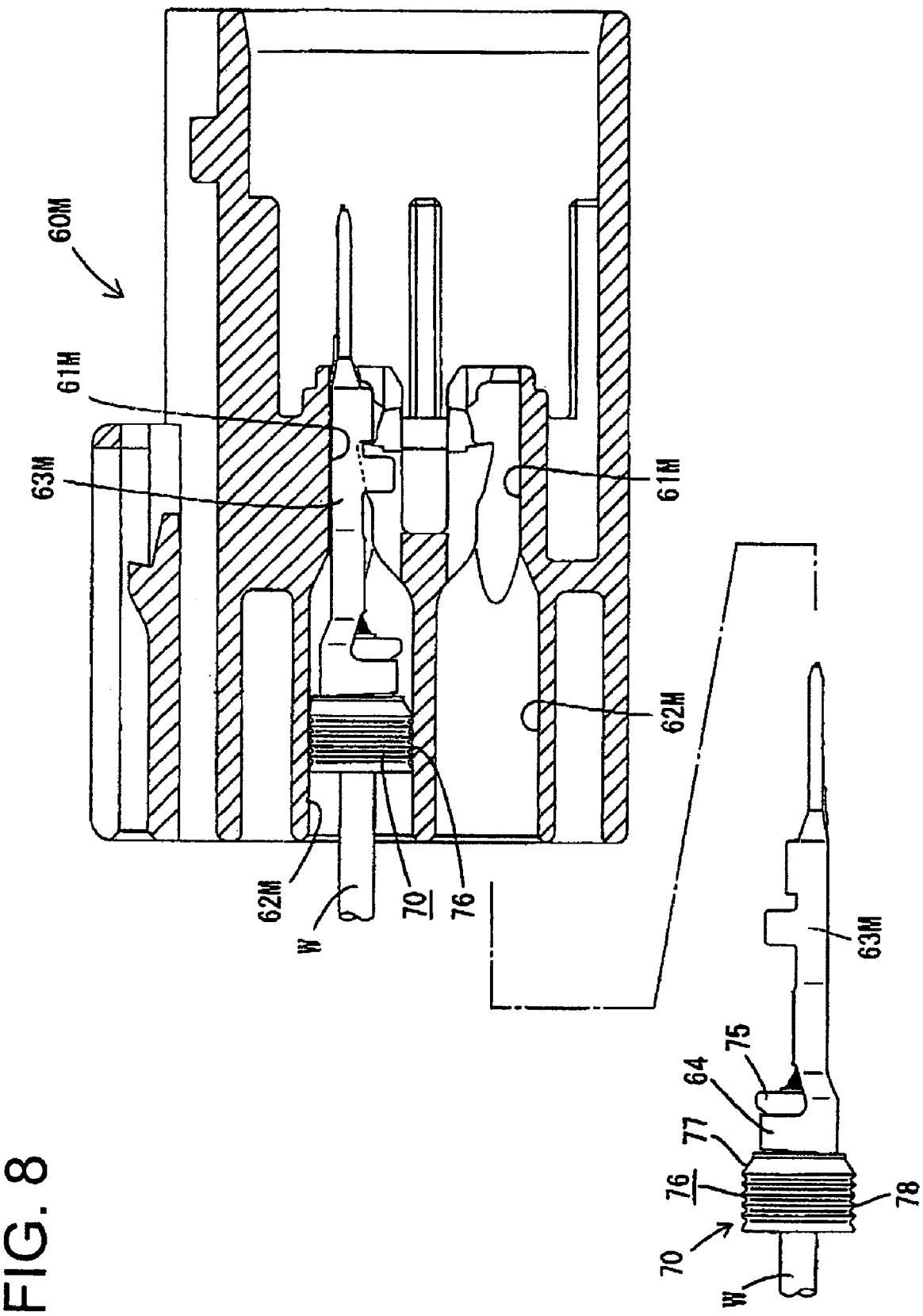
FIG. 8 is a side view in section showing an operation of inserting a male terminal and the waterproof rubber plug into a cavity of a male housing.

A waterproof resilient plug according to a third embodiment of the invention is identified by the numeral 70 in FIGS. 6 to 8. The waterproof resilient plug 70 is made of a resilient material such as an oil-impregnated silicone and is substantially rotationally symmetric about its longitudinal axis. As shown in FIG. 6, the plug 70 has a main body 71 with a center hole 72 through which a wire W is introduced and an inner lip 73 is formed around the center hole 72. A thinner mounting tube 74 projects from one edge of the center hole 72, and a retaining projection 75 is formed on the outer circumferential surface of a projecting end of the mounting tube 74.

A wide single lip 76 is formed on the outer surface of the main body 71, and extends over substantially the entire extension. A moderately inclined surface 77 tapers in at an end of the lip 76 towards the mounting tube 74. The wide lip 76 has a longitudinal extension of more than about 1/4, preferably more than about 1/3, and most preferably more than about half of the longitudinal extension of the main body 71. Further, an undulated surface 78 having a short radial projecting distance is formed in the outer surface of the lip 76.

The waterproof rubber plug 70 is mounted on an end of a wire W, and an insulation barrel 64 of a female terminal 63F then is crimped, bent or folded into connection with the outer circumferential surface of the mounting tube 74, as shown in FIG. 7. Thus, the waterproof rubber plug 70 is secured to the end of the wire W together with and behind the female terminal 63F.

The female terminal 63F is inserted from behind into a cavity 61F in a female housing 60F, and the waterproof rubber plug 70 is inserted into an entrance 62F of the cavity 61F at a final stage of the inserting operation. The inclined surface 77 contacts the opening edge of the entrance 62F to center the waterproof rubber plug 70 and to guide the plug 70 into the cavity 61F. Thus, the radially outer surface of the single lip 76 is compressed uniformly over the entire circumference. When the female terminal 63F is inserted to a proper position, the outer surface of the lip 76 of the waterproof rubber plug 70 closely contacts the entire inner circumferential surface of the entrance 62F of the cavity 61F by the action of a resilient force to seal the cavity 61F.

A sealing force is proportional to a resiliently compressed volume of the outer part of the lip 76. However, only one lip 76 having the wide top surface is formed. Thus, a resiliently compressed volume of the entire outer part is larger than conventional general waterproof rubber plugs formed with three lips although the radially outer surface is formed with the fine undulation. As a result, a larger sealing force can be obtained.

The waterproof rubber plug 70 is centered during insertion into the cavity 61F. Thus, the outer surface of the lip 76 is compressed uniformly resiliently over the entire circumference. Further, the fine undulated surface 78 in the outer surface of the lip 76 reduces a contact area between the outer surface of the lip 76 and the inner circumferential surface of the cavity 61F to decrease frictional resistance. Thus, an inserting force for the waterproof rubber plug 70 can be reduced to be smaller.

Easiness to set parting lines using the recesses of the undulated surface 78 and nondamageability due to the short height of the undulation even if an undercut or overhanging portion is formed because of the undulated surface 78 hold similar to the dummy plug 20 shown in the first embodiment.

As shown in FIG. 8, the waterproof rubber plug 70 is secured to an end of a wire W together with and behind a male terminal 63M. The plug 70 then is inserted into an entrance 62M of a cavity 61M of a male housing 60M to seal the cavity 61M as the male terminal 63M is inserted into the cavity 61M. The same functions and effects as in the case of being used in the female side can be obtained.

Figure 9B:
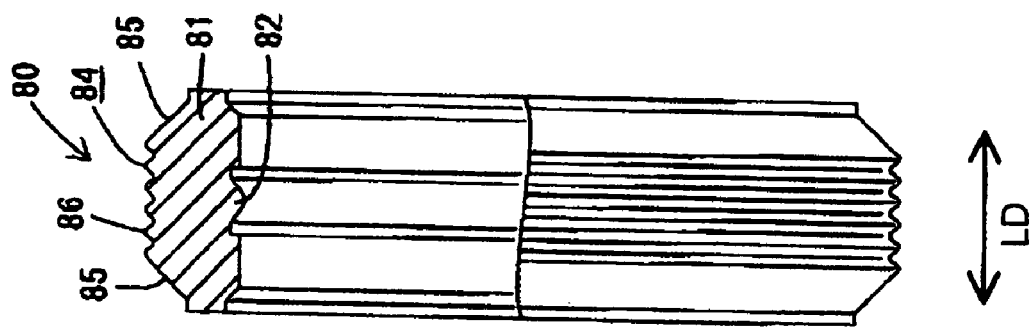
FIGS. 9(A) and 9(B) are a front view and a side view partly in section of a packing according to a fourth embodiment of the invention.
Figure 9A:
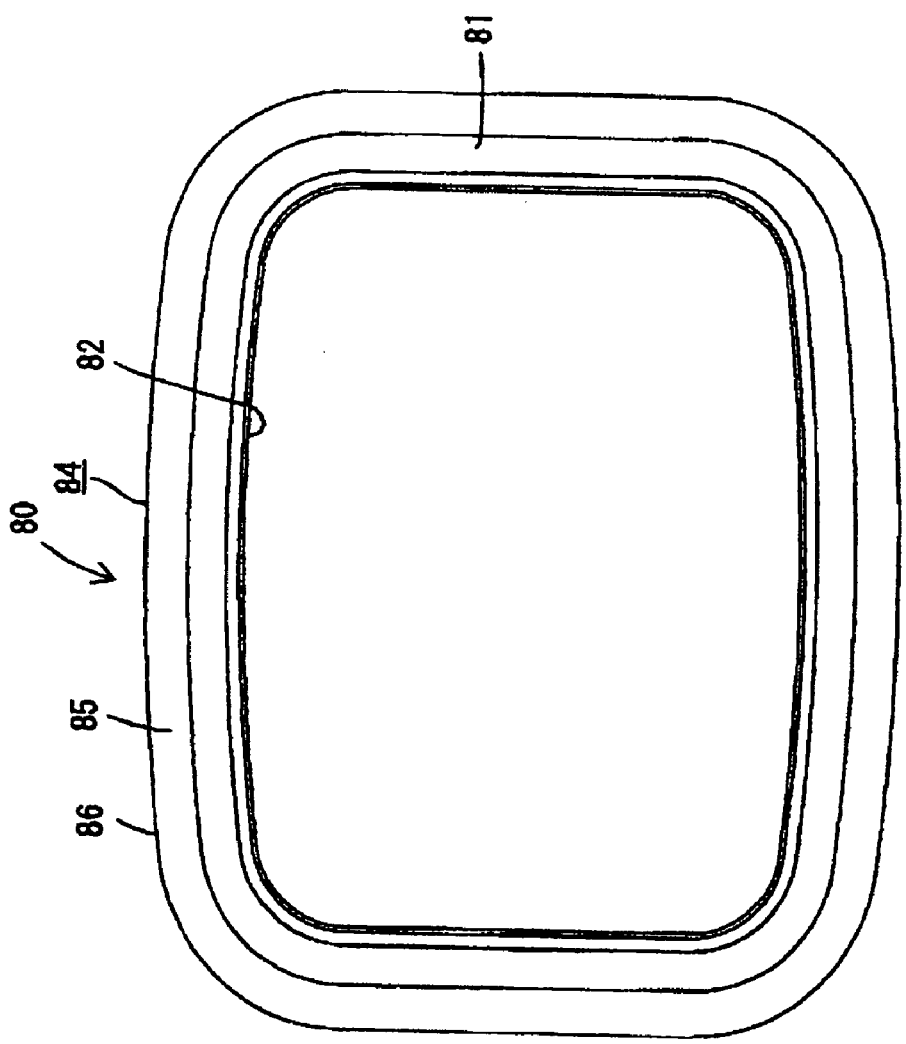
Figure 10:
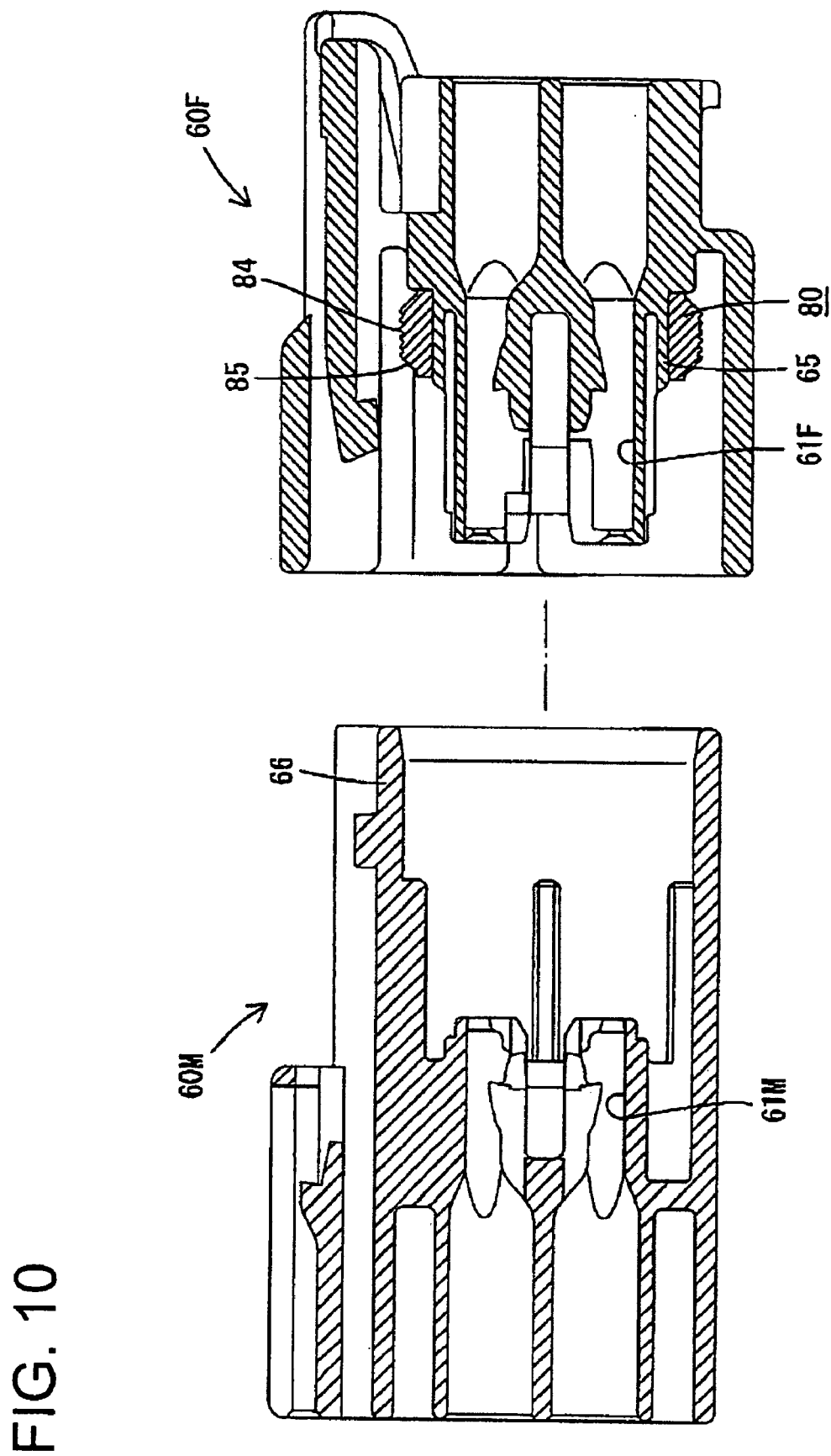
FIG. 10 is a side view in section showing a state before a female and a male housings are connected.
Figure 11:
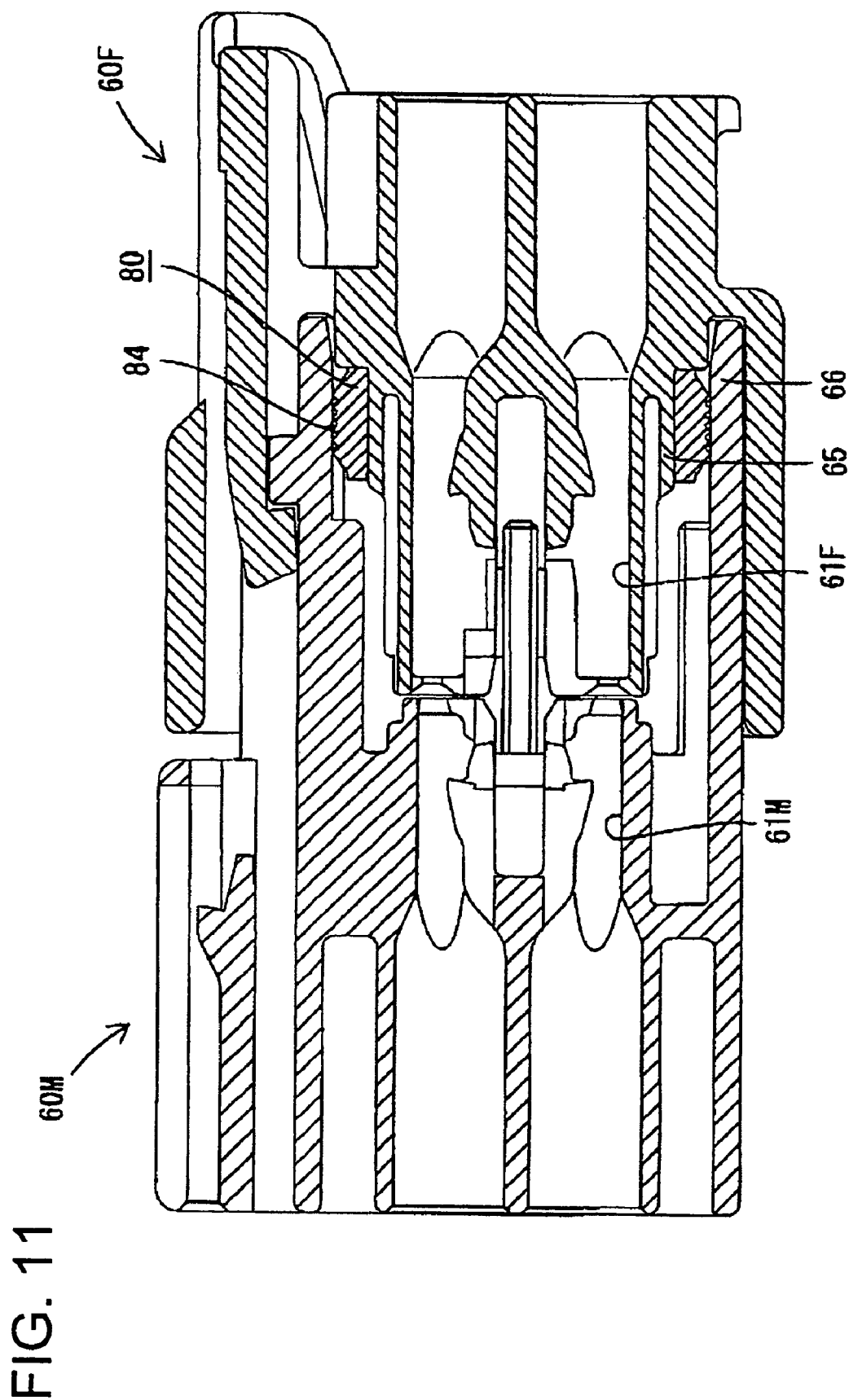
FIG. 11 is a side view in section showing a state after the connection.

A packing according to a fourth embodiment of the invention is identified by the numeral 80 in FIGS. 9 to 11. The packing 80 provides sealing between female and male housings 60F, 60M. More particularly, the female housing 60F has a tower 65 formed with cavities 61F, and the packing 80 is fit on the outer circumferential surface of the tower 65. Thus, the packing 80 can be squeezed between the outer surface of the tower 65 and the inner surface of a receptacle 66 of the mating male housing 60M.

The packing 80 is made of a resilient material such as an oil-impregnated silicone and, as shown in FIG. 9(A), includes a ring-shaped main body 81 that defines a wide rectangle in front view. The packing 80 is symmetrically shaped along longitudinal direction LD. An inner lip 82 is formed on the inner circumferential surface of the main body 81.

A wide single lip 84 is formed on the outer circumferential surface of the main body 81 and inclined surfaces 85 are formed at opposite ends. The inclined surfaces 85 taper in at moderate angles of less than about 30°, preferably of less than about 20° and most preferably about 15° to the longitudinal direction LD are formed at the opposite sides. The wide lip 84 has a longitudinal extension of more than about ¼, preferably of more than about ⅓ and most preferably more than about half of the longitudinal extension of the main body 81. An undulated surface 86 having a short radial projecting distance is formed in the outer surface of the lip 84.

As shown in FIG. 10, the packing 80 is mounted on the outer circumferential surface of the tower 65 of the female housing 60F and then the female and male housings 60F, 60M are connected. The packing 80 is inserted into a space defined by the inner circumferential surface of the projecting end of the receptacle 66 of the male housing 60M during a final stage of the connecting operation. The inclined surface 85 at the front end with respect to an inserting direction contacts the opening edge of the projecting end of the receptacle 66 to center the packing 80. Thus, the outer surface of the single lip 84 is compressed uniformly over substantially the entire circumference as the packing 80 is inserted into the receptacle 66. The packing 80 is squeezed resiliently over substantially the entire circumference between the inner surface of the receptacle 66 and the outer surface of the tower 65 when the two housings 60F, 60M are connected properly as shown in FIG. 11 to provide sealing between the two housings 60F, 60M.

The packing 80 is formed with only one lip 84 having the wide top outer surface. Thus, a resiliently compressed volume is large and a large sealing force can be obtained. Further, the inclined surface 85 centers the packing 80 during insertion into the receptacle 66, and the outer surface of the lip 84 is compressed uniformly over substantially the entire circumference. Further, the fine undulated surface 86 in the outer surface of the lip 84 reduces a contact area between the outer surface of the lip 84 and the inner circumferential surface of the receptacle 66, thereby decreasing a frictional resistance. Thus, an inserting force for the packing 80 is smaller and, in its turn, a connecting force for the female and male housings 60F, 60M is smaller.

The parting lines can be set in the recesses of the undulated surface 86 and damage is unlikely due to the short height of the undulation even if an undercut or overhanging shape is formed.

The inclined surfaces 85 of the lip 84 are substantially symmetrical at the front and rear ends. Thus, the packing 80 can be inserted into the mating receptacle 66 with a smaller force due to the inclined surface 85, and the female and male housings 60F, 60M can be connected with a smaller force regardless of whether the front or rear side of the packing 80 is mounted first on the outer surface of the tower 65. In other words, the packing 80 can be mounted on the tower 65 irrespective of the orientation thereof.

Figure 12:
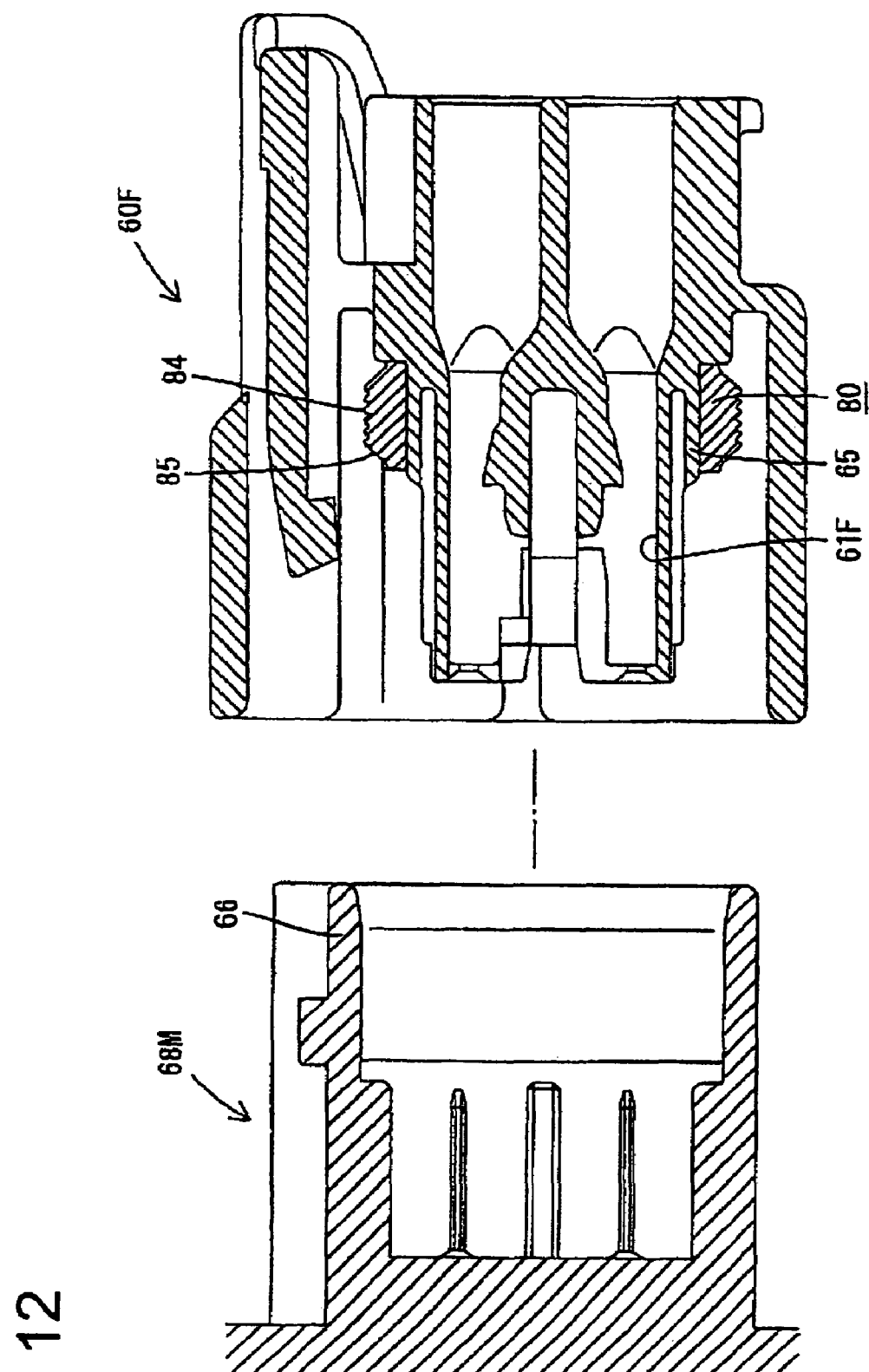
FIG. 12 is a side view in section showing a state before a female and a male housings according to a fifth embodiment are connected.
Figure 13:
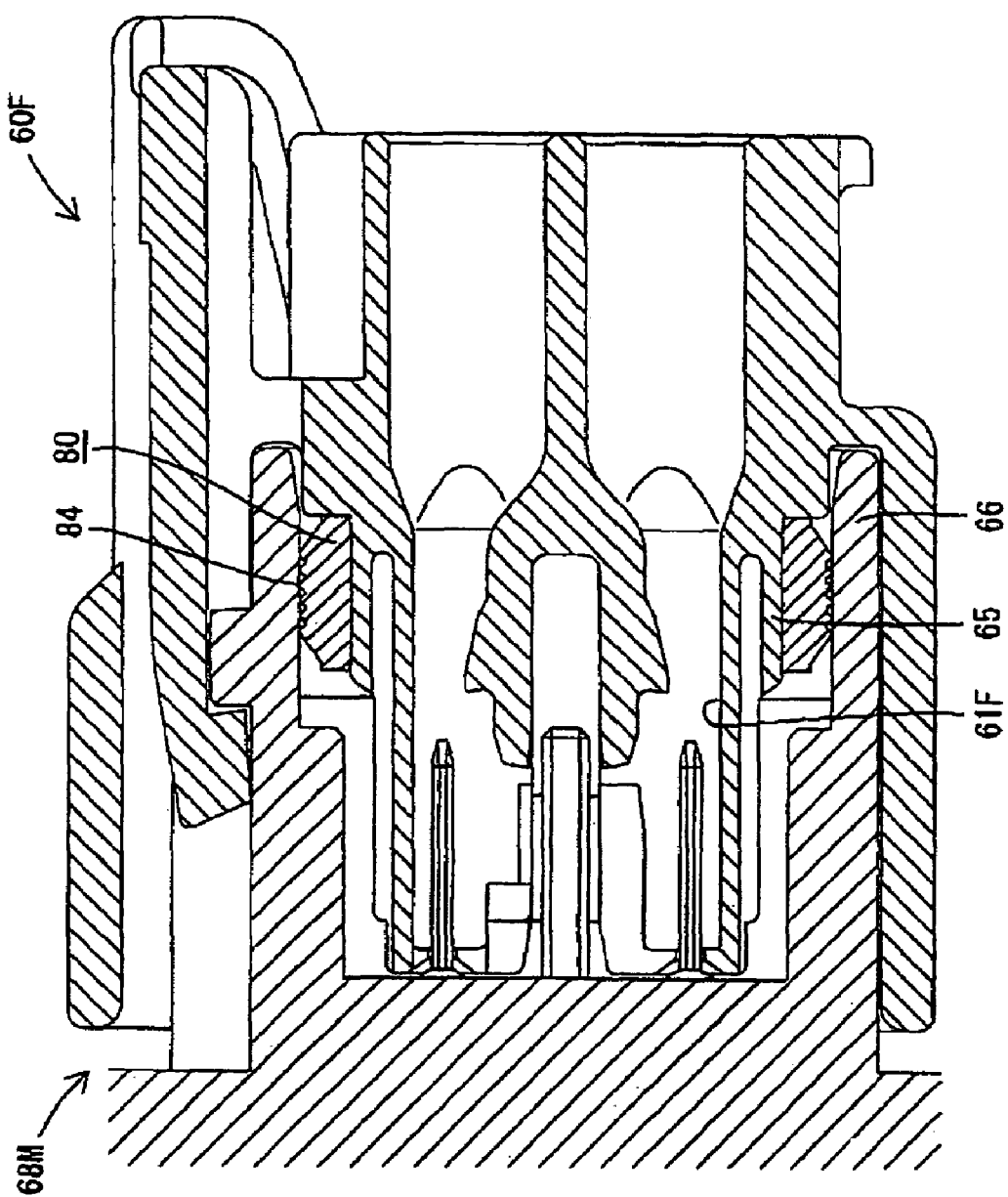
FIG. 13 is a side view in section showing a state after the connection.

The packing 80 of the fourth embodiment is applicable if the male housing 68M is on a side surface of an apparatus as shown in FIGS. 12 and 13 instead of being provided at an end of a wiring harness, i.e. the male housing 60M is of the type directly connected with the apparatus such as a junction box. Even in such a case, similar functions and effects can be obtained.

The invention is not limited to the above described and illustrated embodiments. For example, the following embodiments are also embraced by the invention as defined by the claims, and still other changes can be made without departing from the scope of the invention as defined by the claims.

The parting lines of the mold may be at intermediate positions of oblique surfaces extending from the projections towards the recesses of the undulated surface instead of being at the bottom of the undulated surface.

Inclined surfaces need not be at both ends the lip on the dummy plug and the packing. Rather, it is sufficient to provide the inclined surface at the front side with respect to the inserting direction if the inserting orientation of the dummy plug into the cavity is determined. Further, it is sufficient to provide the inclined surface at the side of the packing facing the receptacle if the end to be opposed to the receptacle is determined.

The outer surface of the lip may be smooth with no undulations. Even with such a construction, there can be obtained effects of larger sealing forces in the cavity and the receptacle and smooth insertion into the cavity and the receptacle. Thus, a smooth outer surface is embraced by the invention.

What is claimed is:

1. A seal made of a resilient material and used to hermetically seal a recess in a housing of a watertight connector by being inserted into the recess, the seal having opposite first and second ends, a cross-sectionally small portion adjacent the first end, a cross-sectionally large portion extending from the cross-sectionally small portion towards the second end, the cross-sectionally large portion including an outer circumferential surface having an inclined region with a small diameter end in proximity to the cross-sectionally small portion of the seal and a large diameter end farther from the cross-sectionally small portion of the seal, a substantially cylindrical section extending from the inclined section towards the second end of the seal, the substantially cylindrical section being characterized by an array of fine undulations with alternating annular recesses and annular projections, the annular projections being configured so that a plane can be tangent to outer surfaces of the annular projections and so that the outer surfaces can closely contact an inner surface of the recess.

2. The seal of claim 1, wherein the small diameter end of the inclined surface is cross-sectionally smaller than the recess in the housing for facilitating insertion of the seal into the recess.

3. The seal of claim 2, wherein the seal is a substantially solid dummy plug for hermetically sealing a cavity in the housing and having no terminal fitting accommodated therein.

4. The seat of claim 2, wherein the seal is a waterproof resilient plug (70) used to seal an entrance side of a cavity (61F) in the housing (60F), the rubber plug (70) being secured to an end of a wire (W) by a terminal fitting (63F) inserted into the cavity (61F).

5. The seal of claim 2, wherein the seal is a packing (80) to provide hermetic sealing between a pair of housings (60F; 60M) that are connectable by engaging a projecting part (65) and a recessed part (66), the seal (80) being mounted on an outer surface of the projecting part (65) and being resiliently squeezed between an outer surface of the projecting part (65) and the inner surface of the recessed part (66).

6. The seal of claim 1, wherein a radial dimensional difference between the annular projections and the annular recesses is smaller than a radial dimensional difference between the large and small diameter ends of the inclined region.

7. The seal of claim 1, wherein the seal is symmetrical and has inclined surfaces at opposite longitudinal ends of the undulated surface.

8. The seal of claim 1, wherein the cross-sectionally large portion extends over more than about half the longitudinal extension of the seal.

9. The seal of claim 1, wherein the seal is substantially rotationally symmetric about a longitudinal axis.

10. The seal of claim 1, wherein a radial dimensional difference between the annular recesses and the annular projections of the undulations is approximately one-third of a radial dimensional difference between the small and large diameter ends of the inclined region.

11. The seal of claim 1, wherein the cross-sectionally large portion has a length greater than one-fourth of a distance between the first and second ends of the seal.

12. The seal of claim 1, wherein the cross-sectionally large portion has a length greater than one-third of a distance between the first and second ends of the seal.

13. The seal of claim 1, wherein the cross-sectionally large portion has a length greater than two-thirds of a distance between the first and second ends of the seal.

14. The seal of claim 1, wherein the inclined section defines an angle of between about 15° and 30° to an axis extending between the first and second ends of the seal.

15. A seal made of a resilient material and used to hermetically seal a recess in a housing of a watertight connector by being inserted into the recess, the seal having opposite first and second ends defining a length for the seal, first and second cross-sectionally small portions adjacent the first and second ends respectively, a cross-sectionally large portion extending continuously from the first cross-sectionally small portion to the second cross-sectionally small portion and defining a length more than about half of the length of the seal, the cross-sectionally large portion including first and second inclined regions adjacent the first and second cross-sectionally small portions respectively, each of the first and second inclined regions having a small diameter end in proximity to the adjacent cross-sectionally small portion of the seal and a large diameter end farther from the respective cross-sectionally small portion of the seal, a substantially cylindrical section extending continuously from the first inclined region to the second inclined region, the substantially cylindrical section being characterized by an array of fine undulations with alternating annular recesses and annular projections, the annular projections being configured so that a plane can be tangent to outer surfaces of the annular projections and so that the outer surfaces of the annular projections can closely contact an inner surface of the recess in the housing, the annular recesses defined by the array of fine undulations each having a diameter that exceeds diameters of the small diameter ends of the inclined regions.

16. The seal of claim 15, wherein a radial dimensional difference between the annular recesses and the annular projections of the undulations is approximately one-third of a radial dimensional difference between the small and large diameter ends of each inclined region.

17. The seal of claim 16, wherein the seal is a substantially solid dummy plug for hermetically sealing a cavity in the housing and having no terminal fitting accommodated therein.

18. The seal of claim 16, wherein the seal is substantially rotationally symmetric about a longitudinal axis.

19. The seal of claim 18, wherein each of the inclined sections defines an angle of between about 15° and 30° to an axis extending between the first and second ends of the seal.

* * * * *